(12) United States Patent
Takeda et al.

(10) Patent No.: US 7,720,466 B2
(45) Date of Patent: May 18, 2010

(54) RADIO CONTROL STATION, RADIO TERMINAL, BASE STATION, COMMUNICATION SYSTEM, AND COMMUNICATION METHOD

(75) Inventors: Shinji Takeda, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 93 days.

(21) Appl. No.: 10/855,640

(22) Filed: May 28, 2004

(65) Prior Publication Data

US 2005/0037770 A1    Feb. 17, 2005

(30) Foreign Application Priority Data

May 28, 2003    (JP)    ............................ P2003-151333

(51) Int. Cl.
*H04M 3/00*    (2006.01)
(52) U.S. Cl. .................. 455/419; 455/464; 455/450; 455/451; 455/452; 455/515
(58) Field of Classification Search .................. 455/419, 455/127.1, 434, 33.1, 464, 446, 455, 515, 455/516, 452, 450, 451; 370/468
See application file for complete search history.

(56) References Cited

U.S. PATENT DOCUMENTS

| | | | | |
|---|---|---|---|---|
| 5,212,803 A | * | 5/1993 | Uddenfeldt et al. | ......... 455/434 |
| 5,353,332 A | * | 10/1994 | Raith et al. | .................. 455/455 |
| 6,418,313 B1 | * | 7/2002 | Wallstedt | .................... 455/434 |
| 6,912,256 B1 | * | 6/2005 | Noblet | ........................ 375/260 |
| 6,931,026 B1 | * | 8/2005 | Lee et al. | ..................... 370/468 |
| 2001/0014608 A1 | * | 8/2001 | Backstrom et al. | .......... 455/450 |
| 2003/0050070 A1 | * | 3/2003 | Mashinsky et al. | .......... 455/452 |
| 2004/0048587 A1 | * | 3/2004 | Diao et al. | ............... 455/127.1 |
| 2004/0180656 A1 | * | 9/2004 | Stephan et al. | .............. 455/434 |

FOREIGN PATENT DOCUMENTS

| | | |
|---|---|---|
| EP | 1 130 799 | 9/2001 |
| JP | 63-200629 | 8/1988 |
| JP | 8-168070 | 6/1996 |
| JP | 2002-218551 | 8/2002 |
| JP | 2003-9239 | 10/2003 |
| JP | 2004-511986 | 4/2004 |
| WO | WO 98/51103 | 11/1998 |
| WO | WO 99/35866 | 7/1999 |
| WO | WO 03/084273 A1 | 10/2003 |

OTHER PUBLICATIONS

Gang Wu, et al. "MIRAI Architecture for Heterogeneous Network", IEEE Communications Magazine, XP-001125429, Feb. 2002, pp. 126-134.

* cited by examiner

*Primary Examiner*—Lester Kincaid
*Assistant Examiner*—Charles Shedrick
(74) *Attorney, Agent, or Firm*—Oblon, Spivak, McClelland, Maier & Neustadt, L.L.P.

(57)    ABSTRACT

A communication system includes a transmission unit configured to transmit control information relating to plural radio communication systems to a radio terminal through a dedicated control channel commonly used by the plural radio communication systems and for transmitting the control information relating to the plural radio communication systems.

13 Claims, 6 Drawing Sheets

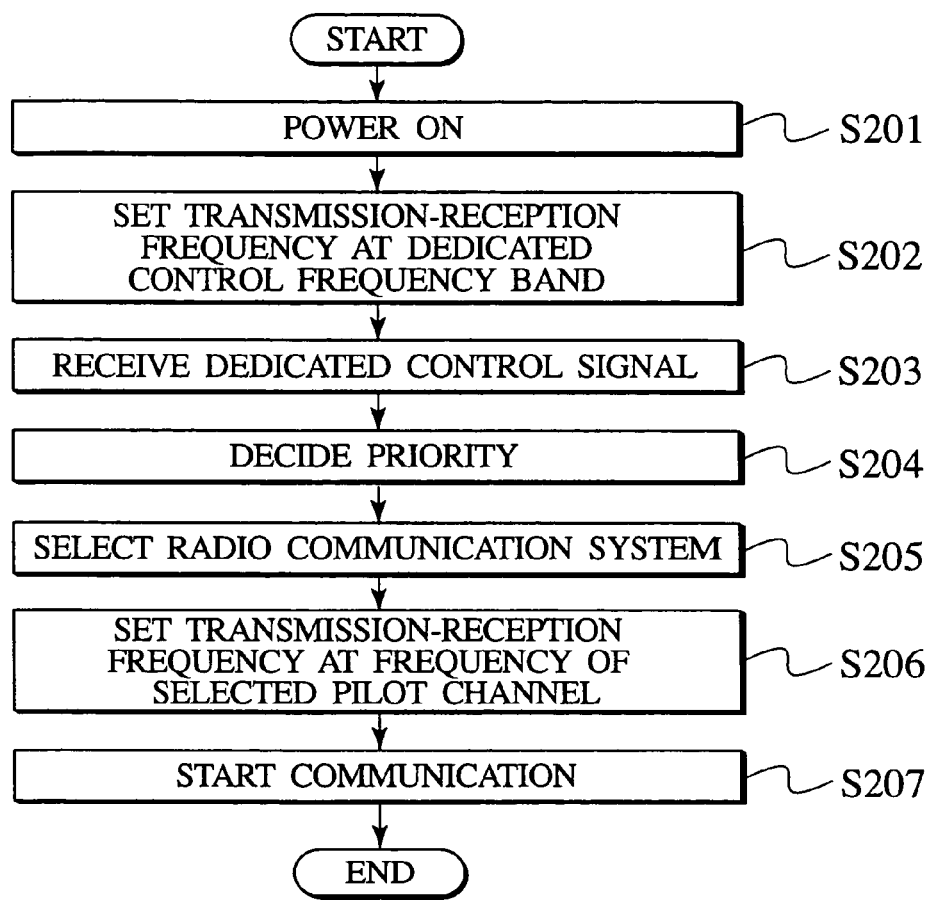
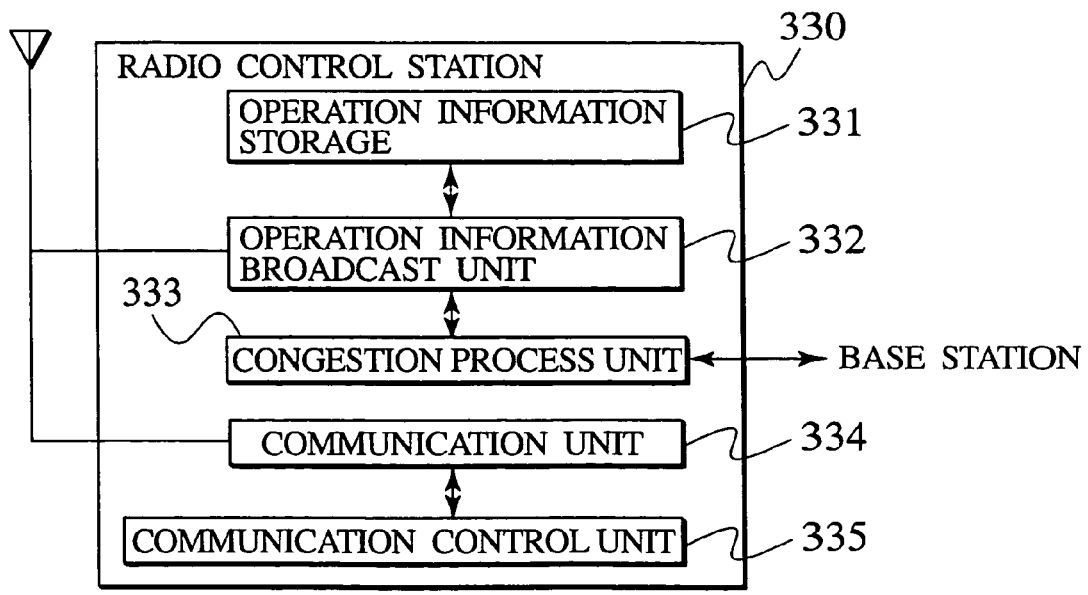

RADIO CONTROL STATION, RADIO TERMINAL, BASE STATION, COMMUNICATION SYSTEM, AND COMMUNICATION METHOD

CROSS REFERENCE TO RELATED APPLICATIONS

This application is based upon and claims the benefit of priority from the prior Japanese Patent Application No. P2003-151333, filed on May 28, 2003; the entire contents of which are incorporated herein by reference.

BACKGROUND OF THE INVENTION

1. Field of the Invention

The present invention relates to a radio control station, a radio terminal, a base station, a communication system, and a communication method.

2. Description of the Related Art

Conventionally, one radio terminal generally received radio communication services through one radio communication system. However, advances of radio techniques have made it possible to provide plural transmitters-receivers in one radio terminal. As a result, radio terminals have become available, which allow the use of plural radio communication systems within the borders such as PHS (Personal Handyphone system) and PDC (Personal Digital Cellular Telecommunication System).

A radio terminal 340 of this type consists of plural communication units 342a to 342c which are transmitters-receivers adapted to respective radio communication systems, as shown in FIG. 1. Each of the plural communication units 342a to 342c independently transmits and receives control signals using a control channel such as a pilot channel of the respective radio communication system to connect a communication path to the respective communication system.

For example, there is determined which of the communication units 342a to 342c is used for the communication depending on system selection information that is input from the outside. For example, an input unit 341 receives system selection information, which is input from the outside and is related to a radio communication system selected by the user of the radio terminal 340. Based on the input system selection information, an input unit 341 instructs one of the communication units 342a to 342c that corresponds to the selected radio communication system to perform communication.

Conventionally, as shown in FIG. 2, when the radio terminal 340 is powered on and activated (S301), it retrieves and receives a pilot channel of each radio communication system to retrieve radio communication systems available for communication and to thereby select a radio communication system to be used for communication (S302). The radio terminal 340 can select a radio communication system by receiving the input of system selection information that is selected by the user of the radio terminal 340.

Alternatively, the last radio communication system through which the radio terminal 340 communicated may automatically be selected. The radio terminal 340 sets the transmission-reception frequency at the frequency of the pilot channel of the selected radio communication system (S303). Then, the radio terminal 340 transmits and receives control signals using the pilot channel to connect a communication path to the radio communication system and to start communication (S304).

Another technique for retrieving systems usable for communication from among plural radio communication systems is disclosed in Japanese Patent Laid-Open No. 2003-9239. According to the technique, a base station transmits a control channel added with control information relating to control channels over which control signals are broadcasted by the other mobile communication systems different from the mobile communication system to which the control channel itself belongs. A radio terminal determines a control channel to receive based on the control information thus provided.

However, according to the method in which a radio terminal retrieves and receives the control channel of each radio communication system to retrieve radio communication systems available for communication, there will be an increase in the number of radio communication systems that the radio terminal can use increases and in the number of control channel frequency bands that must be received, which will result in an increase in the time required for retrieving radio communication systems available for communication. Such an increase in retrieving time results in an increase in power consumption of the radio terminal, which is not preferable from the viewpoint of the duration of the battery of the radio terminal.

According to the method in which a transmitted control channel is added with control information relating to control channels over which control signals are broadcasted by mobile communication system other than the mobile communication system to which the control channel belongs, every radio communication system is required to transmit control information relating to control channels of other communication systems in addition to control information relating to the control channel of itself. This results in an increase in a control load of every radio communication system and in an increase in a control load of a communication system as a whole including plural radio communication systems. Further, each time a new radio communication system is introduced, control information relating to the control channel of the new radio communication system must be added to the control channels transmitted by all radio communication systems. Thus, the introduction of a new radio communication system involves a complicated process.

BRIEF SUMMARY OF THE INVENTION

It is an object of the present invention to reduce time required for retrieving radio communication systems available for communication without any increase in a control load of a communication system as a whole.

According to an aspect of the present invention, a radio control station includes a transmission unit configured to transmit control information relating to plural radio communication systems to a radio terminal through a dedicated control channel commonly used by the plural radio communication systems and for transmitting the control information relating to the plural radio communication systems.

According to an aspect of the present invention, a radio terminal includes a reception unit configured to receive control information relating to plural radio communication systems through a dedicated control channel commonly used by the plural radio communication systems and for transmitting the control information relating to the plural radio communication systems, and a selection unit configured to select a radio communication system to be used based on the control information received by the reception unit.

According to an aspect of the present invention, a communication system includes plural radio communication systems, and a radio control station including a transmission unit configured to transmit control information relating to the plural radio communication systems to a radio terminal through a dedicated control channel commonly used by the plural radio communication systems and for transmitting the control information relating to the plural the radio communication systems.

According to an aspect of the present invention, a communication method includes transmitting control information relating to plural radio communication systems to a radio terminal through a dedicated control channel commonly used by the plural radio communication systems and for transmitting the control information relating to the plural radio communication systems.

In such a radio control station, radio terminal, communication system and communication method, control information relating to plural radio communication systems can be collectively transmitted to a radio terminal, through the dedicated control channel commonly used by the plural radio communication systems and for transmitting the control information relating to the plural radio communication systems.

Therefore, each of the radio communication systems may transmit only control information relating to its own and may not transmit control information relating to the control channels of the other radio communication systems. It is therefore possible to prevent an increase in a control load of each of the radio communication systems and an increase in a control load of whole the plural radio communication systems.

In addition, a radio terminal can collectively receive control information relating to plural radio communication systems through a dedicated control channel commonly used by the plural radio communication systems. Thus, the radio terminal can retrieve radio communication systems available for communication based on the control information received through the dedicated control channel. It is therefore possible to reduce retrieving time significantly compared to that in a case in which a radio terminal retrieves and receives the control channels of all radio communication systems to retrieve radio communication systems available for communication.

BRIEF DESCRIPTION OF THE SEVERAL VIEWS OF THE DRAWINGS

FIG. 10 is a flow chart showing a communication method according to the second embodiment of the present invention; and FIG. 11 is a block diagram showing a configuration of a radio control station according to a modified example of the present invention.

DETAILED DESCRIPTION OF THE INVENTION

First Embodiment

Figure 1:
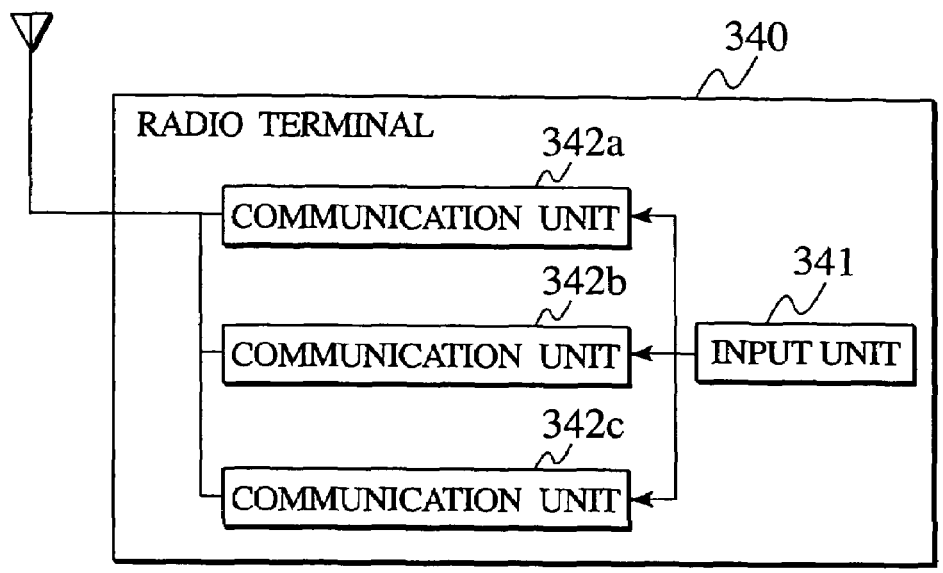
FIG. 1 is a block diagram showing a configuration of a conventional radio terminal.
Figure 2:
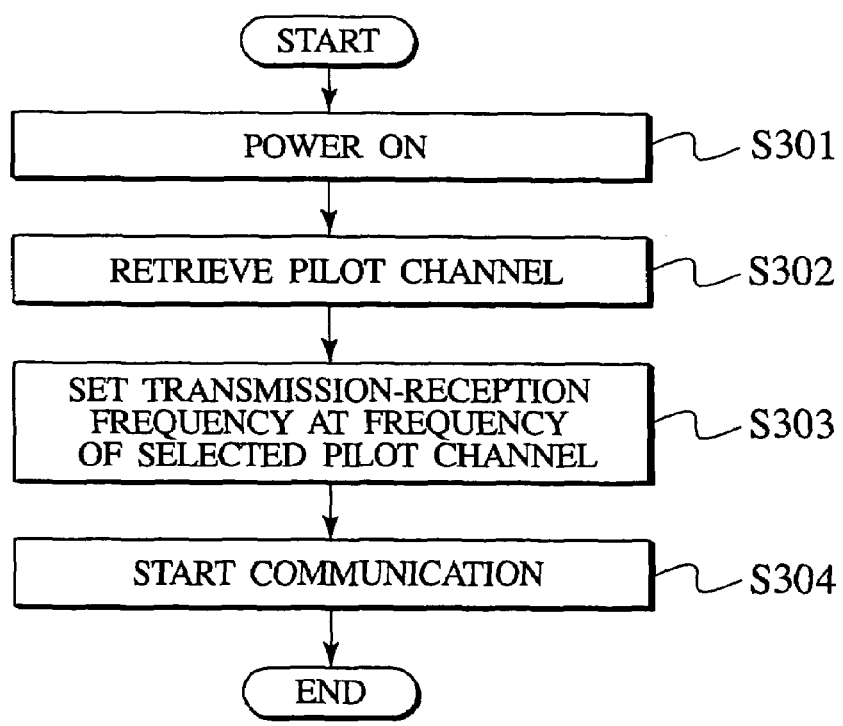
FIG. 2 is a flow chart showing a conventional communication method.
Figure 3:
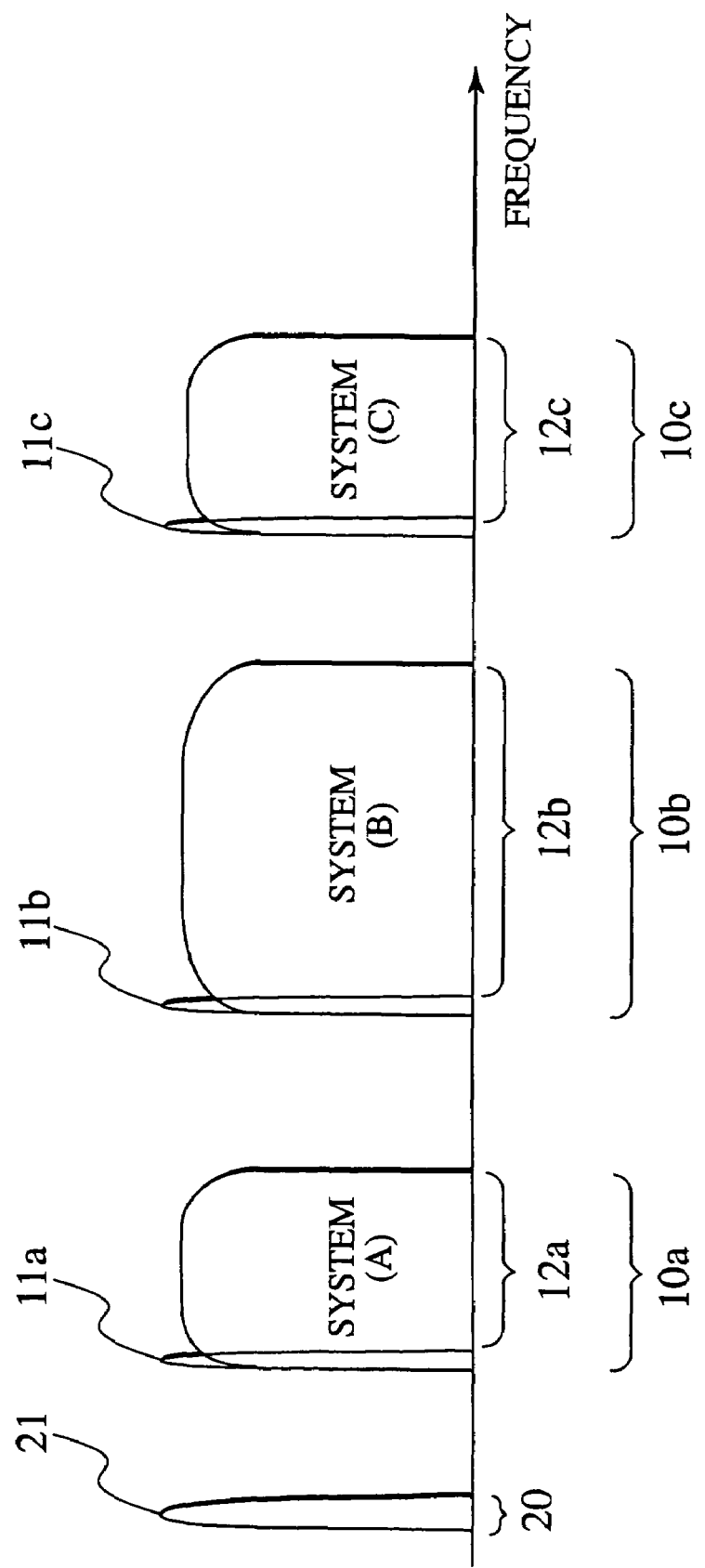
FIG. 3 is a view showing an arrangement of frequency bands in a communication system according to a first embodiment of the present invention.

A communication system includes a radio communication control system and plural radio communication systems, i.e., system(A), system(B), and system(C). Frequency bands of the systems are arranged as shown in FIG. 3. A system(A) frequency band 10a, a system(B) frequency band 10b, and a system(C) frequency band 10c are frequency bands that are used by the systems(A), system(B), and system(C), respectively.

The system(A) frequency band 10a, the system(B) frequency band 10b, and the system(C) frequency band 10c are used for a system(A) pilot channel 11a for transmitting control information relating to the system(A), a system(B) pilot channel 11b for transmitting control information relating to the system(B), and a system(C) pilot channel 11c for transmitting control information relating to the system(C), respectively. The system(A) frequency band 10a, the system(B) frequency band 10b, and the system(C) frequency band 10c are also used for a system(A) communication channel 12a used by the system(A) for communication with a radio terminal, a system(B) communication channel 12b used by the system(B) for communication with a radio terminal, and a system(C) communication channel 12c used by the system (C) for communication with a radio terminal, respectively. The system(A) pilot channel 11a, the system(B) pilot channel 11b, and the system(C) pilot channel 11c are the first control channels that a radio terminal receives when it starts communication.

A dedicated control frequency band 20 is a frequency band used by the radio communication control system. The dedicated control frequency band 20 can be used only for a dedicated control channel 21 for transmitting control information relating to the plural radio communication systems, i.e., the system(A), system(B), and system(C). The dedicated control channel 21 can be used only for transmitting control information and cannot be used for communication.

Therefore, the dedicated control channel 21 can be provided using a narrow frequency band for transmitting control information only which is narrower than the bands for the system(A) communication channel 12a, the system(B) communication channel 12b, and the system(C) communication channel 12c. The radio communication control system may not transmit by using communication channels used for communications with radio terminals and transmits the dedicated control channel 21 only. Therefore, the radio communication system can be constructed using a frequency band that is narrower than the system(A) frequency band 10a, the system (B) frequency band 10b, and the system(C) frequency band 10c used by the system(A), system(B), and system(C) that are radio communication systems.

As shown in FIG. 3, the dedicated control channel 21 is provided independently from the system(A) pilot channel 11a, the system(B) pilot channel 11b, and the system(C) pilot channel 11c of the plural radio communication systems. The dedicated control channel 21 is a channel shared and commonly used by the plural radio communication systems, i.e., the system(A), system(B), and system(C).

It should be noted that since the frequency band of the dedicated control channel 21 is narrow as described above, a frequency band to be used as the dedicated control frequency band 20 can be easily determined. For example, it is preferable to use a frequency band that is commonly used in the world as the dedicated control frequency band 20.

Figure 4:
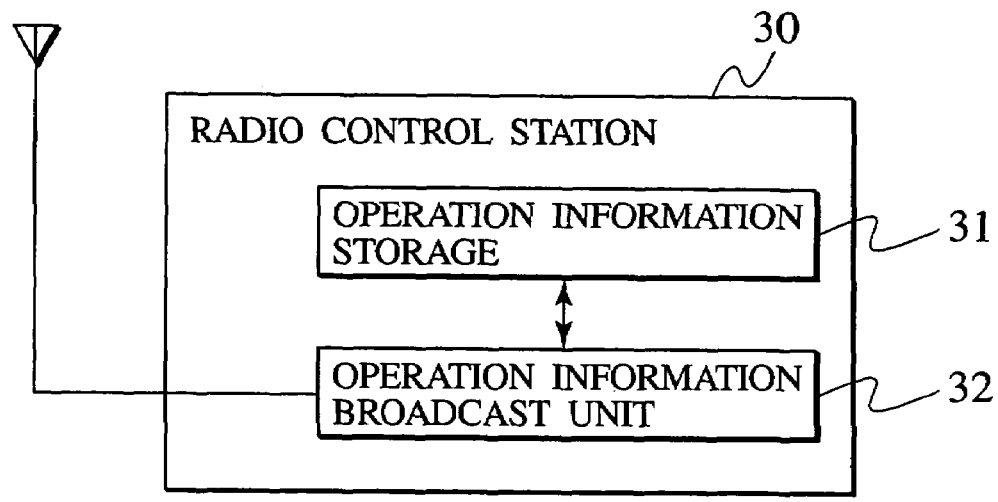
FIG. 4 is a block diagram showing a configuration of a radio control station according to the first embodiment of the present invention.

A radio control station 30 as shown in FIG. 4 is provided in the radio communication control system. The radio control station 30 includes an operation information storage 31 and an operation information broadcast unit 32. The operation information storage 31 stores system operation information relating to the plural radio communication systems. The system operation information is one of control information. The system operation information includes frequency band information relating to frequency bands of the plural radio communication systems and control channel information relating to control channels such as the pilot channels of the plural radio communication.

The frequency bands used by the plural radio communication systems include the entire frequency bands used by the respective radio communication system(A), system(B), and system(C), i.e., the system(A) frequency band 10a, the system(B) frequency band 10b, and the system(C) frequency band 10c and also include frequency bands used as communication channels by the respective radio communication system(A), system(B), and system(C), i.e., the system(A) communication channel 12a, the system(B) communication channel 12b, and the system(C) communication channel 12c. The control channel information includes information on the frequency bands of control channels such as pilot channels, i.e., the frequency bands of the system(A) pilot channel 11a, the system(B) pilot channel 11b, and the system(C) pilot channel 11c.

The system operation information is stored in the operation information storage 31 when the radio control station is installed. When a new radio communication system is introduced, system operation information relating to the new radio communication system is stored in the operation information storage 31. The operation information storage 31 is thus updated. For instance, the system operation information is stored in the operation information storage 31 by communication service provider who provides and manages the radio control station 30.

The operation information broadcast unit 32 is a transmission unit configured to transmit control information relating to the plural radio communication systems to a radio terminal through the dedicated control channel 21 commonly used by the plural radio communication systems and for transmitting the control information relating to the plural radio communication systems.

The operation information broadcast unit 32 acquires the system operation information relating to the plural radio communication systems, i.e., the system(A), system(B), and system(C) as control information relating to the plural radio communication systems from the operation information storage 31. The operation information broadcast unit 32 transmits the acquired system operation information to a radio terminal using the dedicated control channel 21.

The operation information broadcast unit 32 can transmit only the system operation information, namely control information through the dedicated control channel 21. The operation information broadcast unit 32 transmits the system operation information to the radio terminal as a dedicated control signal including control information. Thus, the radio control station 30 broadcasts the system operation information relating to the plural radio communication systems to the radio terminal.

Figure 5:
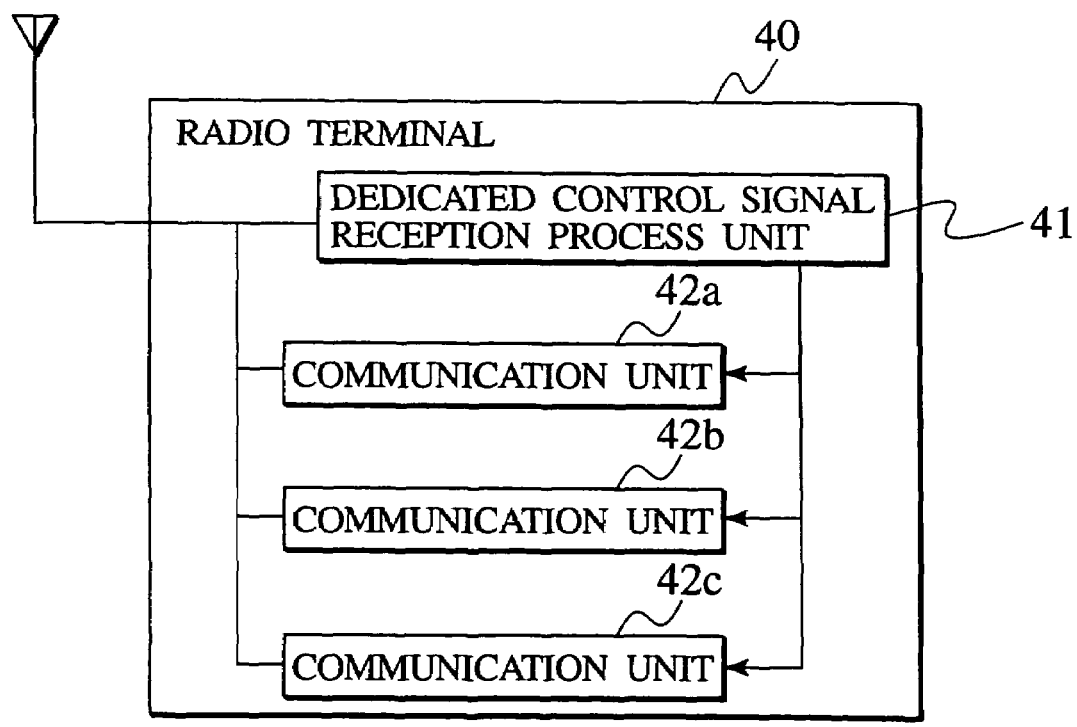
FIG. 5 is a block diagram showing a configuration of a radio terminal according to the first embodiment of the present invention.

As shown in FIG. 5, a radio terminal 40 includes a dedicated control signal reception process unit 41 and plural communication units 42a to 42c. The plural communication units 42a to 42c are transmitters-receivers corresponding the radio communication systems, respectively. The communication units 42a, 42b, and 42c have functions to allow communication through the system(A), system(B), and system(C), respectively. For example, the communication units 42a, 42b, and 42c have hardware adapted to modulation methods and demodulation methods of the system(A), system(B), and system(C), respectively.

The plural communication units 42a, 42b, and 42c transmit and receive control signals to and from base stations of the respective system(A), system(B), and system(C) using the system(A) pilot channel 11a, the system(B) pilot channel 11b, and the system(C) pilot channel 11c of the respective radio communication systems. Thus, the plural communication units 42a, 42b, and 42c connect communication paths to the base stations of the respective radio communication systems, i.e., the system(A), system(B), and system(C). The radio terminal 40 can be thus adapted to the plural radio communication systems.

The dedicated control signal reception process unit 41 is a reception unit configured to receive control information relating to the plural radio communication systems through the dedicated control channel 21 commonly used by the plural radio communication systems and for transmitting the control information relating to the plural of radio communication systems.

When the radio terminal 40 is powered on and activated, the dedicated control signal reception process unit 41 sets a transmission-reception frequency at the dedicated control frequency band 20. The dedicated control signal reception process unit 41 preferably stores the dedicated control frequency band 20 in advance. The dedicated control signal reception process unit 41 may retrieve the dedicated control channel 21 when activated and may set the transmission-reception frequency at the detected dedicated control frequency band 20 of the dedicated control channel 21. In addition, the dedicated control signal reception process unit 41 may store the dedicated control frequency band 20 when it detects the dedicated control channel 21 and may thereafter set the transmission-reception frequency at the dedicated control frequency band 20 thus stored.

The dedicated control signal reception process unit 41 receives system operation information relating to the plural radio communication systems, i.e., the system(A), system (B), and system(C) broadcasted by the radio control station 30 using the dedicated control channel 21. The dedicated control signal reception process unit 41 receives the system operation information as dedicated control signal including control information. The dedicated control signal reception process unit 41 acquires the system operation information from the dedicated control signal thus received.

The dedicated control signal reception process unit 41 retrieves radio communication systems that the radio terminal 40 can use for communication, based on the system operation information relating to the plural radio communication systems thus acquired.

Specifically, the dedicated control signal reception process unit 41 determines whether the radio terminal 40 has a function to allow communication through each of the radio communication systems, i.e., the system(A), system(B), and system(C). For example, the dedicated control signal reception process unit 41 can determine whether one of the communication units 42a, 42b, and 42c can transmit and receive signals at the frequency band used by each of the system(A), system(B), and system(C). The dedicated control signal reception process unit 41 can determine whether it has hardware adapted to the modulation method and demodulation method of each of the system(A), system(B), and system(C).

Further, the dedicated control signal reception process unit 41 can determine whether the radio terminal has been allowed to use each of the radio communication systems, i.e., the system(A), system(B), and system(C). That is, the dedicated control signal reception process unit 41 determines whether a contract has been made on the use of each of the system(A), system(B), and system(C) by the radio terminal 40. As thus described, the dedicated control signal reception process unit 41 retrieves radio communication systems that the radio terminal 40 can use for communication.

The dedicated control signal reception process unit 41 functions as a selection unit configured to select a radio communication system to be used based on the control information received by the reception unit as well. The dedicated control signal reception process unit 41 selects a radio communication system to be used from among the radio communication systems available for communication thus detected. When the dedicated control signal reception process unit 41 detects one first radio communication system available for communication, it may select the radio communication system as a radio communication system to be used and may stop retrieving radio communication systems available for communication.

The dedicated control signal reception process unit 41 inputs the system operation information relating to the selected radio communication system to one of the communication units 42a, 42b, and 42c that corresponds the selected radio communication system, and instructs it to perform communication. The communication unit 42a, 42b, or 42c sets the transmission-reception frequency at the frequency band of the pilot channel of the selected radio communication system based on the input system operation information.

Figure 6:
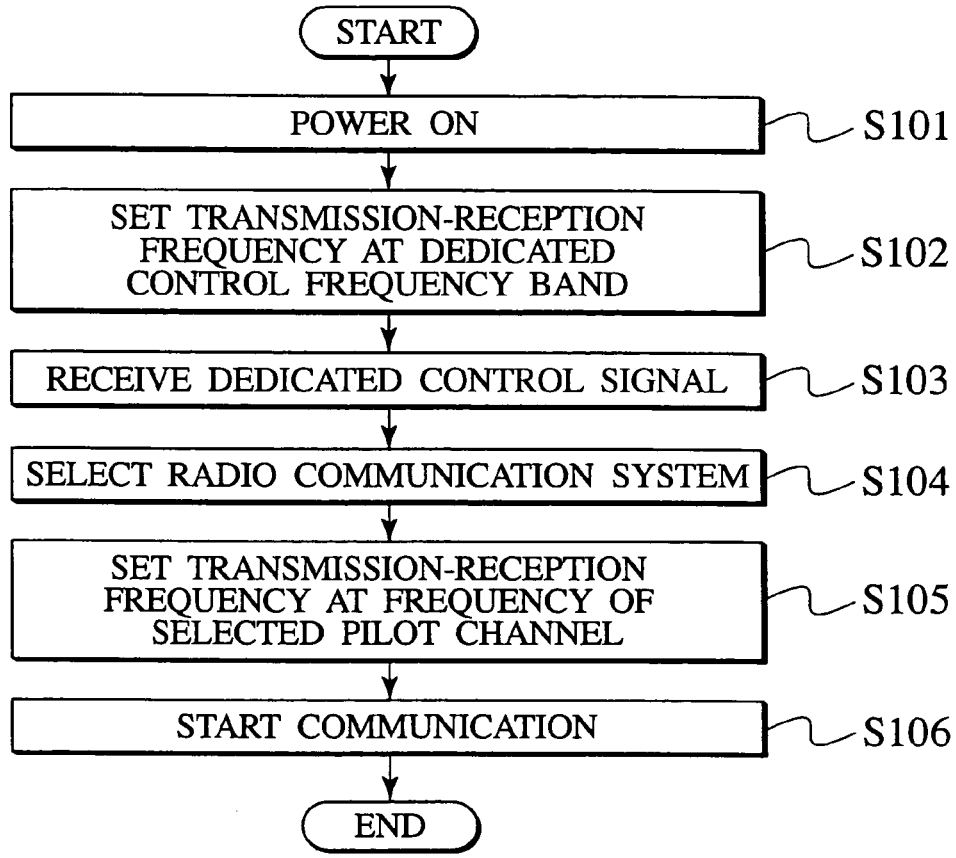
FIG. 6 is a flow chart showing a communication method according to the first embodiment of the present invention.

A communication method will now be described. As shown in FIG. 6, when the radio terminal 40 is powered on and activated (S101), it sets the transmission-reception frequency at the dedicated control frequency band 20 (S102). Then, the radio terminal 40 receives dedicated control signal transmitted from the radio control station 30 at the dedicated control frequency band 20. That is, the radio terminal 40 receives system operation information relating to the plural radio communication systems, i.e. the system(A), system(B), and system(C) broadcasted using the dedicated control channel 21 (S103).

The radio terminal 40 acquires the system operation information from the dedicated control signal thus received. The radio terminal 40 retrieves radio communication systems with which the radio terminal 40 can communicate based on the acquired system operation information. The radio terminal 40 selects a radio communication system to use from among the detected radio communication systems available for communication (S104). The radio terminal 40 sets the transmission-reception frequency at the frequency band of the pilot channel of the selected radio communication system (S105). Then, the radio terminal 40 uses the pilot channel thus retrieved to transmit and receive control signals to and from a base station of the selected radio communication system. Thus, the radio terminal 40 connects a communication path to the base station of the radio communication system, and starts communication (S106).

With the communication system, radio communication control systems, radio control station 30, and radio terminals 40 and the communication method as thus described, control information relating to the plural radio communication systems can be collectively transmitted to the radio terminal 40 through the dedicated control channel 21 commonly used by the plural radio communication systems, i.e., the system(A), system(B), and system(C) for transmitting the control information relating to the plural radio communication system, i.e., the system(A), system(B), and system(C).

Therefore, each of the system(A), system(B), and system (C) may transmit only control information of itself and may not transmit control information relating to the control channels of the other radio communication systems. It is therefore possible to prevent an increase in a control load of each of the radio communication systems to thereby prevent an increase in a control load of as the entire control system including the plural radio communication systems.

The dedicated control signal reception process unit 41 of the radio terminal 40 can collectively receive control information relating to the plural radio communication systems, i.e., the system(A), system(B), and system(C) using the dedicated control channel 21 commonly used by the plural radio communication systems. The dedicated control signal reception process unit 41 can retrieve radio communication systems which is available for communication, based on the control information from the received dedicated control channel 21, and can select a radio communication system to be used.

The radio terminal 40 can therefore retrieve radio communication systems available for communication in each location using the dedicated control channel 21. In addition, the retrieving time of the radio terminal 40 can be significantly shorter than that in a case in which a radio communication system to be used is selected by retrieving and receiving the control channels of all radio communication systems to retrieve radio communication systems available for communication.

Further, when a new radio communication system is introduced in the communication system, it is only necessary to add system operation information of the new radio communication system to the system operation information transmitted by the radio control station 30 using the dedicated control channel 21. Processes associated with the introduction of the new radio communication system can therefore be simple.

The operation information broadcast unit 32 transmits the system operation information such as frequency band information relating to frequency bands of the plural radio communication systems and control channel information relating to the control channels of the plural radio communication systems as the control information. As a result, even when the radio terminal 40 does not grasp the frequency bands used by the radio communication systems and the frequency bands of control channels such as pilot channels, the radio terminal 40 can acquire the system operation information relating to the plural radio communication systems from the dedicated control channel 21.

The use of plural radio communication systems with one radio terminal 40 is available not only for communication in one country but also for communication in plural countries. In the case of communication in the plural countries, the same radio communication system may have communication channels at different frequencies. This is because the frequency band used for radio communication may be different among the countries. Therefore, a radio terminal 40 is able not only to transmit and receive signals at the frequency band of each radio communication system but also to retrieve a radio communication system available for communication across borders. That is, the radio terminal 40 is capable of determining usable frequency bands in order to adapt the plural radio communication systems.

For example, the same radio communication system may use different frequency band depending on countries or regions of a country. Therefore, even when the radio terminal 40 knows the presence of a radio communication system, it may not grasp the frequency band of the control channel of the system or the frequency band used by the radio communication system. Even in such a case, the radio terminal can acquire system operation information relating to the plural radio communication systems from the dedicated control channel 21 if it has a memory of the dedicated control frequency band 20 or it retrieves only the dedicated control channel 21. Thus, the radio terminal 40 can retrieve radio communication systems available for communication, and the retrieving time can be significantly reduced.

Further, the operation information broadcast unit 32 can transmit only system operation information namely, control information through the dedicated control channel 21. That is, the dedicated control channel 21 can be used only for transmission of control information and cannot be used for communication. Therefore, the dedicated control channel 21 of the communication system can be implemented with a narrow frequency band for transmitting control information only. In addition, the radio communication control system may transmit only the dedicated control channel 21 and may not transmit by using communication channel. The radio communication control system can therefore be implemented with a frequency band narrower than a frequency band required for a radio communication system.

Advances are expected in the future in software-based radio techniques in which not only signals but also carrier waves are subjected to digital signal processing to handle differences between the frequencies of carrier waves on a software basis. It is expected that there will consequently be a rapid increase in the number of radio communication systems that a single radio terminal 40 can adapt and a rapid increase in the number of control channel frequency bands that a radio terminal 40 receives. The communication system, radio communication control systems, radio control station 30, and radio terminals 40 and the communication method are useful for such a situation.

Second Embodiment

Figure 7:
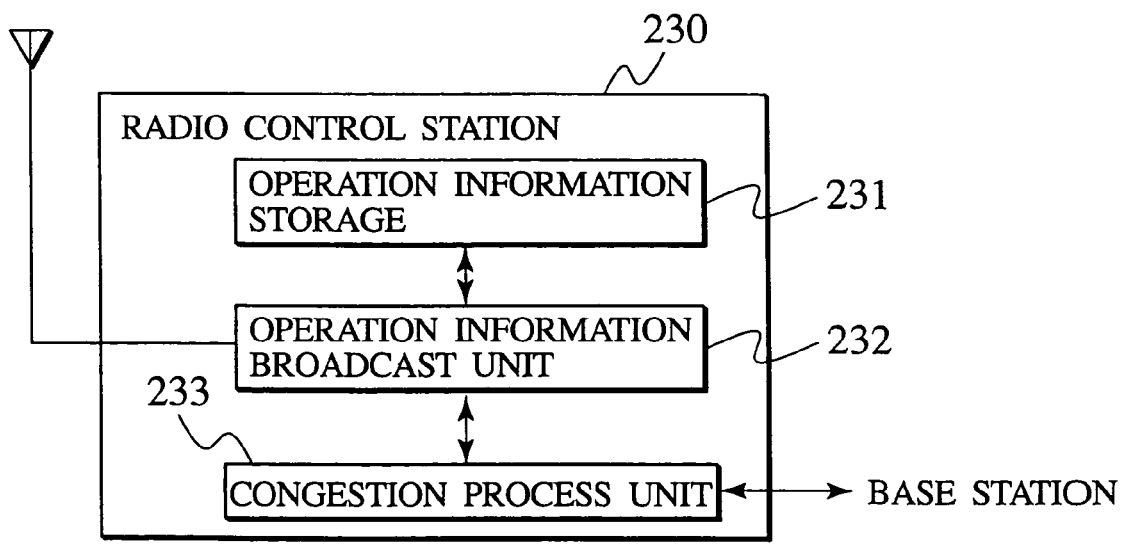
FIG. 7 is a block diagram showing a configuration of a radio control station according to a second embodiment of the present invention.
Figure 8:
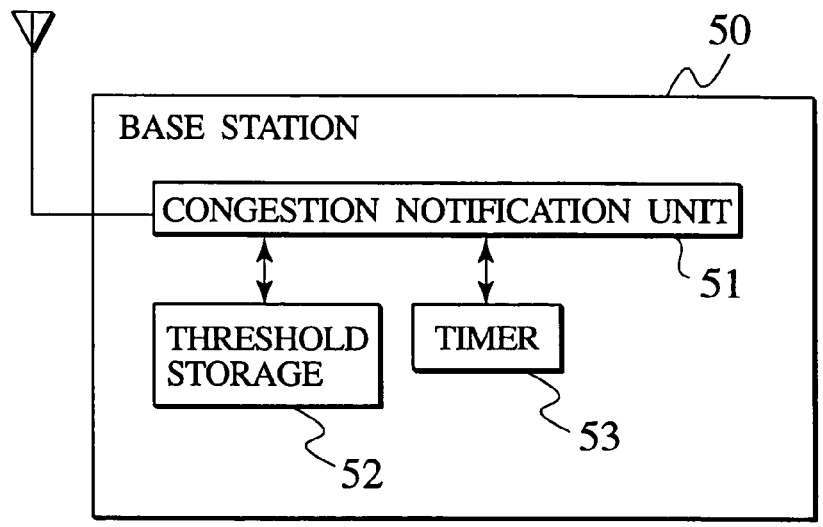
FIG. 8 is a block diagram showing a configuration of a base station according to the second embodiment of the present invention.
Figure 9:
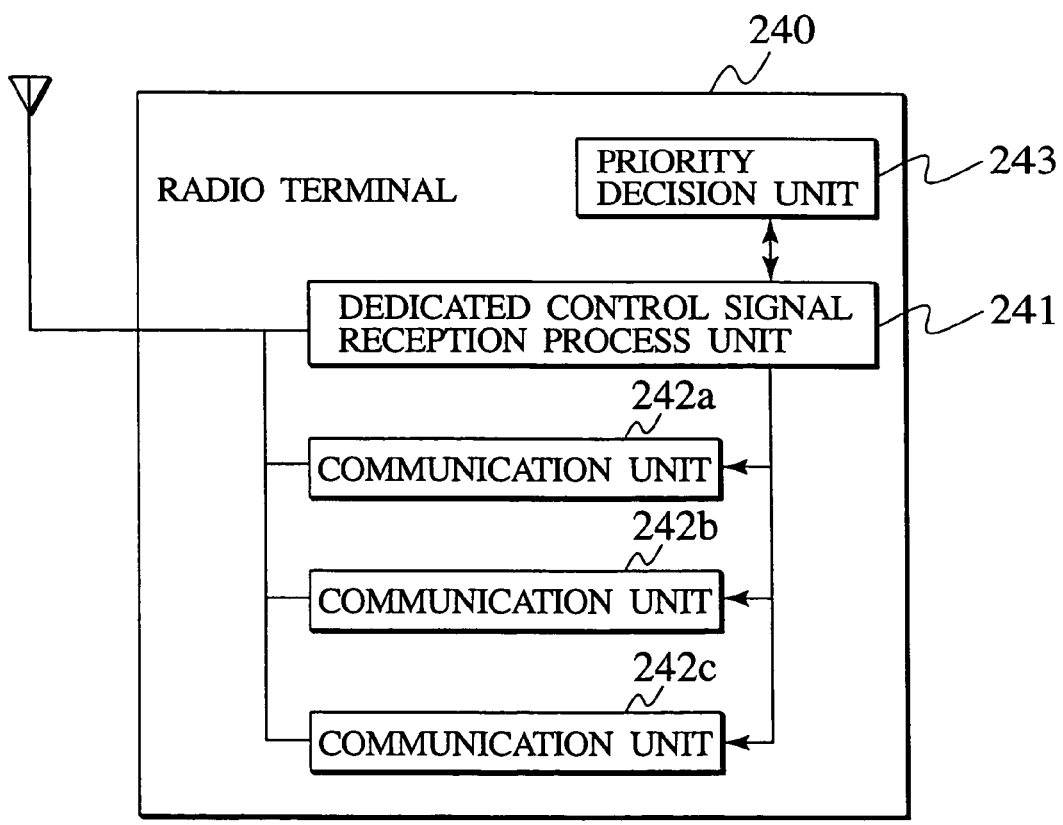
FIG. 9 is a block diagram showing a configuration of a radio terminal according to the second embodiment of the present invention.

A radio control station 230 as shown in FIG. 7 is provided in a radio communication control system. A base station 50 as shown in FIG. 8 is provided in each of radio communication systems, i.e., system(A), system(B), and system(C). A radio terminal 240 as shown in FIG. 9 is used. The communication system of the second embodiment is substantially similar to the communication system of the first embodiment.

As shown in FIG. 7, the radio control station 230 includes an operation information storage 231, an operation information broadcast unit 232, and a congestion process unit 233. The operation information storage 231 is similar to the operation information storage 31 shown in FIG. 4. The congestion process unit 233 is an acquisition unit configured to acquire the congestion information of the plural radio communication systems. The congestion process unit 233 acquires the congestion information by receiving the congestion information of the radio communication systems, i.e., the system(A), system(B), and system(C) from the base stations 50 provided at the radio communication system, i.e., the system(A), system(B), and system(C). The congestion information indicates congestion status of the radio communication system. For example, communication traffic can be used as the congestion information. Specifically, amount of data, or number of packets, which is transmitted and/or received, and number of user connected to the radio communication system can be used as the congestion information.

The congestion process unit 233 receives the congestion information from a base station 50 at predetermined intervals or at arbitrary timing. The predetermined intervals may be either constant intervals or variable intervals. Alternatively, the congestion process unit 233 receives the congestion information from a base station 50 when communication traffic at the base station 50 exceeds a threshold.

In addition, the congestion process unit 233 may request a base station 50 to transmit the congestion information according to an instruction from the operation information broadcast unit 232. The congestion process unit 233 receives the congestion information transmitted from the base station 50 in response to the request. The congestion process unit 233 inputs the congestion information of the radio communication systems, i.e., the system(A), system(B), and system(C) thus acquired to the operation information broadcast unit 232.

The operation information broadcast unit 232 acquires system operation information relating to the plural radio communication systems, i.e., the system(A), system(B), and system(C) as control information relating to the plural radio communication systems from the operation information storage 231. The operation information broadcast unit 232 acquires the congestion information of the plural radio communication systems as control information relating to the plural radio communication systems from the congestion process unit 233.

The operation information broadcast unit 232 transmits the system operation information acquired from the operation information storage 231 and the congestion information acquired from the congestion process unit 233 as control information. Specifically, the operation information broadcast unit 232 prepares control information including system operation information and the congestion information by adding the acquired congestion information to the acquired system operation information. The operation information broadcast unit 232 can transmit only the control information including the system operation information and the congestion information to the radio terminal 240 using the dedicated control channel 21. The operation information broadcast unit 232 transmits the system operation information and the congestion information to the radio terminal 240 as a dedicated control signal including those control information. Thus, the ratio control station 230 transmits at least one of frequency band information relating to frequency bands of the plural radio communication systems, control channel information relating to control channels of the plural radio communication systems, and congestion information of the plural radio communication systems, as the control information.

When the operation information broadcast unit 232 receives the input of the congestion information from the congestion process unit 233, it can prepare control information including system operation information and the congestion information and transmit the control information to the radio terminal 240. Alternatively, until a new congestion information is input from the congestion process unit 233 to update the congestion information, the operation information broadcast unit 232 may prepare control information including system operation information and the congestion information using the previously input congestion information and may transmit the control information to the radio terminal 240.

In a case where the congestion process unit 233 acquires the congestion information when the communication traffic at a base station 50 exceeds a threshold and inputs it to the operation information broadcast unit 232, control information may be transmitted as described below. When the input of congestion information is received from the congestion process unit 233, the operation information broadcast unit 232 can prepare control information including system operation information and the input congestion information, and transmit the control information to the radio terminal 240.

Until the input of congestion information is received from the congestion process unit 233, the operation information broadcast unit 232 can add information on the congestion information in which the communication traffic is equal to or less than the threshold to system operation information to prepare control information including the system operation information and the congestion information, and transmit the control information to the radio terminal 240. The operation information broadcast unit 232 may instruct the congestion process unit 233 to acquire the congestion information.

As shown in FIG. 8, the base station 50 includes a congestion notification unit 51, a threshold storage 52, and a timer 53. The congestion notification unit 51 is a providing unit configured to provide congestion information of the plural radio communication systems to the radio control station 230 configured to transmit control information relating to the plural radio communication systems to a radio terminal 240 through the dedicated control channel 21.

The congestion notification unit 51 provides the radio control station 230 the congestion information of the radio communication system, i.e., the system(A), system(B), or system (C) in which the congestion notification unit 51 is provided. The congestion notification unit 51 provides the congestion information by transmitting it to the radio control station 230.

A congestion notification unit 51 always detects the congestion status of the radio communication system in which the congestion notification unit 51 itself is provided. The congestion notification unit 51 can transmit the congestion information at predetermined intervals or at arbitrary timing to the radio control station 230. The predetermined timing may be either constant intervals or variable intervals. The congestion notification unit 51 can set a timer value of the timer 53. The timer value may be either fixed time or arbitrarily set time. When the timer value expires, the congestion notification unit 51 is notified of the expiration by the timer 53. Upon receipt of the notification from the timer 53, the congestion notification unit 51 transmits the congestion information to the radio control station 230 and sets a timer value.

The timer 53 measures the timer value and notifies the congestion notification unit 51 of the expiration of the timer value. The timer 53 measures a timer value that is set by the congestion notification unit 51 or a timer value that is set in the timer 53 in advance.

Alternatively, the congestion notification unit 51 transmits the congestion information to the radio control station 230 when the communication traffic at the base station 50 exceeds a threshold. The congestion notification unit 51 acquires the threshold of communication traffic to be a criterion for determining whether the congestion notification unit 51 provides congestion information to the radio control station 230 from a threshold storage 52.

The congestion notification unit 51 compares the detected communication traffic with the threshold acquired from the threshold storage 52. When the detected communication traffic is in the excess of the threshold, the congestion notification unit 51 transmits the congestion information to the radio control station 230. When the detected communication traffic is equal to or less than the threshold, the congestion notification unit 51 does not transmit the congestion information to the radio control station 230.

The threshold storage 52 stores threshold to be the criterion for determining whether or not the congestion information is made to provide to the radio control station 230. The threshold may be stored in advance in the threshold storage 52, for example, when the base station 50 is installed. For example, the threshold is stored in the threshold storage 52 by the communication service provider who provided and manages the base station 50. Alternatively, the congestion notification unit 51 may set the threshold and store it in the threshold storage 52. The threshold may be updated depending on the state of the radio communication system.

As shown in FIG. 9, a radio terminal 240 includes a dedicated control signal reception process unit 241, plural communication units 242a to 242c, and a priority decision unit 243. The plural communication units 242a to 242c are similar to the plural communication units 42a to 42c shown in FIG. 5.

The dedicated control signal reception process unit 241 receives the system operation information and the congestion information of the plural radio communication systems, i.e., the system(A), system(B), and system(C) as the control information. The dedicated control signal reception process unit 241 uses the dedicated control channel 21 to receive the system operation information and the congestion information of the plural radio communication systems broadcasted by the radio control station 230 as a dedicated control signal including those control information. The dedicated control signal reception process unit 241 acquires the system operation information and the congestion information from the received dedicated control signal. The dedicated control signal reception process unit 241 inputs the acquired congestion information to the priority decision unit 243.

The priority decision unit 243 decides priority for selecting a radio communication system to be used based on the received congestion information of the plural radio communication systems. The priority decision unit 243 sets an order of priority of the radio communication systems, i.e., the system(A), system(B), and system(C) based on the congestion information acquired from the dedicated control signal reception process unit 241 such that the priority of a system becomes higher as the level of congestion status of the system decreases and becomes lower as the level of congestion status of the system increases. For example, the priority decision unit 243 sets higher priority the smaller the communication traffic of the system and sets lower priority the greater the communication traffic. Thus, the radio terminal 240 can select a radio communication system of higher vacancy with priority. The priority decision unit 243 inputs the priority thus set to the dedicated control signal reception process unit 241.

The dedicated control signal reception process unit 241 selects a radio communication system to be used, based on the priority decided by the priority decision unit 243 and the system operation information. The dedicated control signal reception process unit 241 determines whether the radio terminal 240 can use the radio communication systems for communication based on the acquired system operation information, the determination being sequentially made starting with the radio communication system having the highest priority. The dedicated control signal reception process unit 241 can determine whether the radio communication systems can be used for communication in the same manner as done by the dedicated control signal reception process unit 41 shown in FIG. 5.

When the radio communication system having the highest priority is available for communication, the dedicated control signal reception process unit 241 selects the radio communication system as a radio communication system to be used. When the radio communication system having the highest priority is not available for communication, the dedicated control signal reception process unit 241 determines whether the radio communication system having the second highest priority is available for communication based on the system operation information. The dedicated control signal reception process unit 241 repeats the process of determining whether the systems are available for communication in the order of priority until a radio communication system available for communication is found and a radio communication system to be used can be selected. The dedicated control signal reception process unit 241 inputs the system operation information of the selected radio communication system to the communication unit 242a, 242b, or 242c that corresponds the selected radio communication system and instructs the communication unit 242a, 242b, or 242c to perform communication.

A communication method will now be described. As shown in FIG. 10, when a radio terminal 240 is powered on and activated (S201), it sets the transmission-reception frequency at a dedicated control frequency band 20 (S202). Then, the radio terminal 240 receives the dedicated control signal transmitted by the radio control station 230 at the dedicated control frequency band 20. That is, the radio terminal 240 receives the system operation information and congestion information of the plural radio communication systems broadcasted using the dedicated control channel 21 (S203).

The radio terminal 240 acquires the system operation information and congestion information from the received dedicated control signal. The radio terminal 240 decides priority for the selection of a radio communication system to be used based on the acquired congestion information (S204). The radio terminal 240 selects a radio communication system to be used based on the priority decided and the system operation information. The radio terminal 240 determines whether the radio terminal 240 can use the radio communication systems for communication based on the system operation information to select a radio communication system to be used, the determination being sequentially made starting with the radio communication system having the highest priority (S205). Thereafter, steps S206 and S207 are carried out. The steps S206 and S207 are substantially the same as the steps S105 and S106 shown in FIG. 4.

The communication system, radio communication control system, radio control station 230, radio terminals 240, base stations 50, and communication method as thus described allow the following advantageous to be achieved in addition to the advantages that can be achieved by the communication system, radio communication control system, radio control station 30, radio terminals 40, and communication method in the first embodiment.

In the radio control station 230, the congestion process unit 233 acquires the congestion information of the plural radio communication systems, i.e., the system(A), system(B), and system(C), and the operation information broadcast unit 232 transmits the acquired congestion information as the control information. Therefore, the radio control station 230 can easily recognize the congestion status of the plural radio communication systems and transmit it to a radio terminal 240. A radio terminal 240 can acquire the congestion information of each of the radio communications systems. Therefore, the radio terminal 240 can select a radio communication system be used based on the congestion information of each of the radio communication systems. As a result, the communication system can distribute communication traffic.

Further, the dedicated control signal reception process unit 241 receives the congestion information of the plural radio communication system as control information, and the priority decision unit 243 decides priority for the selection of a radio communication system to be used based on the congestion information thus received. The dedicated control signal reception process unit 241 selects a radio communication system to be used based on the priority decided.

Thus, a radio terminal 240 can acquire the congestion information of each of the radio communication systems and decide priority for the selection of a radio communication system to be used based on the congestion information. The radio terminal 240 can select a radio communication system at a high level of vacancy with priority as a radio communication system to be used based on the priority thus decided. Therefore, the radio terminal 240 can select a radio communication system to be used efficiently based on the congestion information of each of the radio communication systems, which allows communication traffic to be distributed.

For example, when the radio communication system at the highest level of vacancy is a radio communication system that the radio terminal 240 can use for communication, the radio terminal 240 can determine whether the system is a radio communication system with which the radio terminal 240 can communicate only once. Thus, a radio communication system at a high level of vacancy can be efficiently selected with priority compared to a case in which all radio communication systems are determined with respect to their availability for communication and in which a radio communication system to be used is selected based on the congestion information.

The base station 50 includes the congestion notification unit 51 configured to provide congestion information of the radio communication systems to the radio control station 230, which transmits control information to a radio terminal 240 using the dedicated control channel 21. Thus, the base station 50 can provide congestion information to the radio control station 230 that transmits the dedicated control channel. Therefore, the radio control station 230 can easily acquire the congestion information and provide it to a radio terminal 240. As a result, communication traffic can be distributed in the communication system.

[Modification]

The present invention is not limited to the above-described first and second embodiments and may be modified in various ways. In the first and second embodiments, the radio control stations 30 and 230 are provided in the radio communication control system independently of the system(A), system(B), and system(C) that have a communication channel. However, the radio control stations 30 and 230 may alternatively be provided in the system(A), system(B), or system(C) that has a communication channel.

For example, a radio control station 330 as shown in FIG. 11 may be provided in one of the system(A), system(B), and system(C) that are radio communication systems. The radio control station 330 includes an operation information storage 331, an operation information broadcast unit 332, a congestion process unit 333, a communication unit 334, and a communication control unit 335. The operation information storage 331, the operation information broadcast unit 332, and the congestion process unit 333 are similar to the operation information storage 231, the operation information broadcast unit 232, and the congestion process unit 233 respectively shown in FIG. 7.

The communication unit 334 communicates with a radio terminal using a communication channel. The communication control unit 335 controls the communication performed by the communication unit 334. Therefore, the radio control station 330 has a function of communicating with a radio terminal using a communication channel to provide the radio terminal with radio communication services in addition to the function of transmitting control information relating to the plural radio communication systems using a dedicated control channel. Such transmission unit configured to transmit control information to a radio terminal using the dedicated control channel may be provided anywhere in the communication system. Information other than control information may be transmitted over the dedicated control channel.

Various modifications will become possible for those skilled in the art after receiving the teachings of the present disclosure without departing from the scope thereof

What is claimed is:

1. A radio control station comprising:
a transmission unit configured to transmit control information to a radio terminal via a dedicated control channel, the control information enables the radio terminal to connect to one of plural radio communication systems for conducting communication, the plural radio communication systems respectively operating in separate frequency bands, a frequency band of the dedicated control channel is outside of the frequency bands of the plural radio communication systems, the control information is provided exclusively to the radio terminal from the radio control station via the dedicated control channel, the control information indicates a frequency band of a pilot channel of each of the plural radio communication systems, and the pilot channel is a first channel that the radio terminal receives when the radio terminal connects to one of the plural radio communication systems.

2. A radio control station of claim 1, wherein the transmission unit transmits congestion information of the plural radio communication systems to the radio terminal.

3. A radio control station of claim 2, further comprising:
an acquisition unit configured to acquire the congestion information of the plural radio communication systems, wherein the transmission unit transmits the congestion information acquired by the acquisition unit as the control information to the terminal.

4. A radio control station of claim 1, wherein the transmission unit transmits only the control information via the dedicated control channel.

5. A radio terminal configured to selectively communicate via one of plural radio communication systems, comprising:
a reception unit configured to receive control information via a dedicated control channel; and
a communication unit configured to set reception frequency of the radio terminal to a frequency band of a pilot channel, based on the control information received by the reception unit, the control information enables the radio terminal to connect to one of plural radio communication systems for conducting communication, the plural radio communication systems respectively operating in separate frequency bands, a frequency band of the dedicated control channel is outside of the frequency bands of the plural radio communication systems, the control information is provided exclusively to the radio terminal from the radio control station via the dedicated control channel, the control information indicates a frequency band of a pilot channel of each of the plural radio communication systems, and the pilot channel is a first channel that the radio terminal receives when the radio terminal connects to one of the plural radio communication systems.

6. A radio terminal of claim 5, further comprising:
a priority decision unit configured to decide priority for selecting a radio communication system to be used based on congestion information of the plural radio communication systems,
wherein the reception unit receives the congestion information as the control information, and
the selection unit selects the radio communication system to be used, based on the priority decided by the priority decision unit.

7. The radio control station of claim 1 wherein congestion information is provided thereto by a base station.

8. A communication system, comprising:
plural radio communication systems;
a radio control station including a transmission unit configured to transmit control information via a dedicated control channel; and
a radio terminal configured to receive the control information via the dedicated control channel, and to set reception frequency of the radio terminal to a frequency band of a pilot channel based on the received control information, the control information enables the radio terminal to connect to one of plural radio communication systems for conducting communication, the plural radio communication systems respectively operating in separate frequency bands, a frequency band of the dedicated control channel is outside of the frequency bands of the plural radio communication systems, the control information is provided exclusively to the radio terminal from the radio control station via the dedicated control channel, the control information indicates a frequency band of a pilot channel of each of the plural radio communication systems, and the pilot channel is a first channel that the radio terminal receives when the radio terminal connects to one of the plural radio communication systems.

9. A communication method, comprising:
transmitting control information from a radio control station to a radio terminal via a dedicated control channel;
receiving, at the radio terminal, the control information via the dedicated control channel; and
setting, at the radio terminal, reception frequency of the radio terminal to a frequency band of a pilot channel based on the received control information, the control information enables the radio terminal to connect to one of plural radio communication systems for conducting communication, the plural radio communication systems respectively operating in separate frequency bands, a frequency band of the dedicated control channel is outside of the frequency bands of the plural radio communication systems, the control information is provided exclusively to the radio terminal from the radio control station via the dedicated control channel, the control information indicates a frequency band of a pilot channel of each of the plural radio communication systems, and the pilot channel is a first channel that the radio terminal receives when the radio terminal connects to one of the plural radio communication systems.

10. The radio control station of claim 1, wherein the radio terminal is configured to set a reception frequency at a frequency band of a pilot channel of one of the plural radio communication systems based on the control information indicating the frequency band of the pilot channel of each of the plural radio communication systems.

11. The terminal of claim 5, wherein the communication unit is configured to set the reception frequency at the frequency band of the pilot channel of one of the plural radio communication systems based on the control information indicating the frequency band of the pilot channel of each of the plural radio communication systems.

12. The communication system of claim 8, wherein the radio terminal is configured to set the reception frequency at the frequency band of the pilot channel of one of the plural radio communication systems based on the control information indicating the frequency band of the pilot channel of each of the plural radio communication systems.

13. The communication method of claim 9, wherein the setting includes setting the reception frequency at the frequency band of the pilot channel of one of the plural radio communication systems based on the control information indicating the frequency band of the pilot channel of each of the plural radio communication systems.

* * * * *